Figure 1:
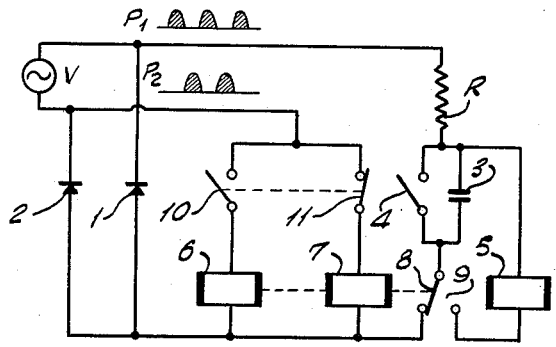

Oct. 22, 1963  W. ZÜHLSDORF ETAL  3,108,206
RELAY CIRCUIT
Filed April 23, 1959

INVENTORS
WERNER ZÜHLSDORF
GEORGE KRUSE
BY KLAUS BEHRMANN

United States Patent Office 3,108,206
Patented Oct. 22, 1963

3,108,206
RELAY CIRCUIT
Werner Zühlsdorf, Georg Kruse, and Klaus Behrmann, Berlin, Germany, assignors to VEB Wissenschaftlich-Technisches Büro für Gerätebau, Berlin, Germany
Filed Apr. 23, 1959, Ser. No. 808,459
1 Claim. (Cl. 317—140)

The invention pertains to the storage of signals in control circuits with relays with two stable states, say, for computers.

Circuits are known in which a relay responds only after a surge voltage has decayed, thus releasing the magnetic energy stored by this voltage in the coil.

Circuits are also known in which a relay is switched by energy stored in a capacitor when an impressed voltage is removed, the capacitor being connected in series with the relay winding, with a rectifier connected in parallel with the same winding, so that when the voltage is impressed, the capacitor is charged via the rectifier, acting thereby as a low-resistance shunt across the relay winding, thus preventing actuation of the relay, while after the voltage has been removed, the capacitor discharges through the winding and the resistance, the rectifier acting as a high-resistance shunt across the winding.

These circuits are employed especially when the switching of the relay depends upon the switching position of a contact of the same relay.

The known methods of relay control at the instant of time when an impressed voltage is removed, described above, have the disadvantage that the contact that effects the removal of the voltage must disconnect the entire load, resulting in considerable wear owing to arcing with ensuing breakdown, due to the inductive or capacitive properties of the circuit to be switched. This is especially true when one contact is used to switch simultaneously the coils or the capacitors of several relays to be controlled.

Connecting a rectifier in parallel with the winding of a relay is a disadvantage in cases where a relay is equipped with several windings, in that currents are induced by transformer action in the other windings of the same relay during the discharge of a capacitor to one winding, these currents interfering with relay action as a result of the parallel shunting of the rectifier across the other windings. Hence the dimensions of the capacitors must be made considerably greater if the desired effect is to be obtained.

Another method is known for controlling relay circuits by means of pulses. Here the contacts are switched whenever the pulse line connected to the contacts is at zero potential.

This known method, in which voltage pulses are used to control relays so that their contacts make and break under no load, has the disadvantage that a contact cannot be made under load, though this can be done with practically no wear if the relay contacts are dimensioned appropriately and they are adjusted to eliminate bouncing. This method requires additional components to damp the inductive voltage peaks occurring at the instant the pulse vanishes, since the known pulse generators provide for complete conductive separation from the voltage source.

The method of impulse excitation and of the excitation of relays through capacitors when a voltage is removed, as well as known electronic circuits in which signals are stored for a short time by capacitors, have the disadvantage that mistakes in control are unavoidable whenever thumping occurs as the contact inducing the pulse voltage or charging the capacitors is closed, or whenever the pulse is fed into the electronic control system.

A principal advantage of the invention is the elimination of these disadvantages by storing the signals in control circuits with relays possessing two stable states.

The signal storage is effected by storing electrical charging energy in capacitors in dependence on the switching conditions of contacts and contact networks. The switching action to be brought about in accordance with the charging condition of the capacitors is initiated by a double-throw switch. In accordance with the invention the charging of the capacitors is effected by a half-wave voltage $P_1$ in order to avoid mistakes in control due to thumping of the double-throw switch, whereas a second half-wave voltage $P_2$ supplies the magnetic coils controlling the double-throw switch. The two half-wave voltages are produced by valves from any desired A.C. voltage and they are 180° out of phase electrically with respect to a common terminal N.

The invention will be understood from the following description and drawing wherein.

Figure 2:
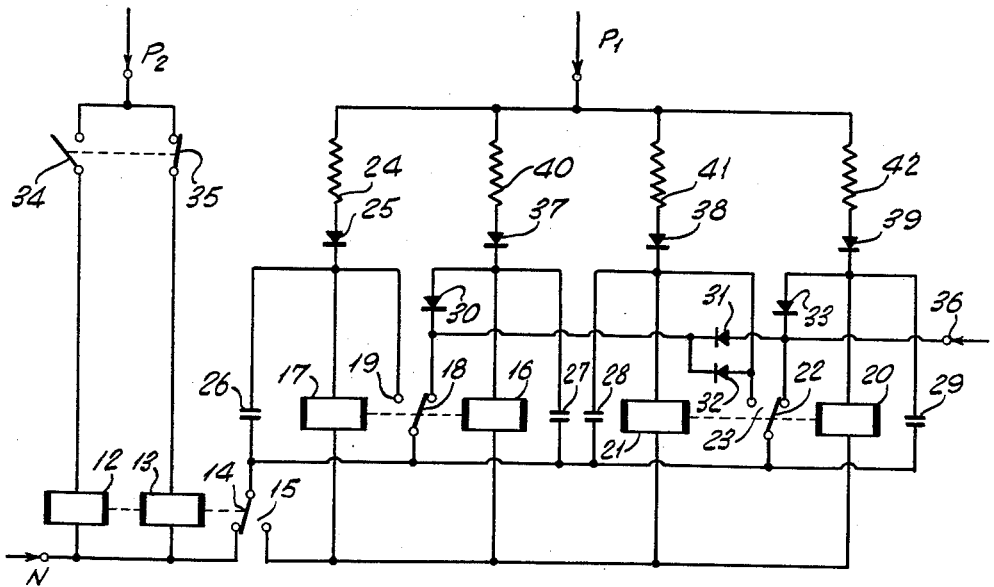

FIGURE 1 is a basic circuit diagram illustrating the principles behind the invention; and FIGURE 2 illustrates a circuit for reducing the number of signals.

In FIGURE 1, an A.-C. voltage impressed across terminals V and O is converted into two half-wave voltages $P_1$ and $P_2$, 180° out of phase with respect to each other, which have a common terminal N.

One half-wave voltage $P_1$ is used to store electric charge energy in capacitor 3 through a resistance R before a control signal arrives whenever contact 4 is open. The other half-wave voltage $P_2$ supplies the controlling relay 6, 7, 8, 9. When a control signal arrives, say, when a key 10, 11 is actuated to make the circuit at 10, the relay coil 6 of relay 6, 7, 8, 9 is energized, provided the half-wave voltage $P_2$ is at a potential differing from that at the common terminal N. This opens contact 8 of relay 6, 7, 8, 9 and closes contact 9. The charge energy of capacitor 3 is discharged through the coil of a controlled relay 5, actuating the latter. After the control signal has passed, for example, when the key 10, 11 returns to its break position 11, relay coil 7 of the control relay 6, 7, 8, 9 is energized whenever the half-wave voltage $P_2$ is at a potential differing from that of the common terminal N. The resulting switching of the switch contact 8, 9 to the position 8 causes the capacitor 3 to be recharged by the half-wave voltage $P_1$, provided contact 4 remains open as before.

An embodiment of the basic circuit of FIG. 1, used to reduce the number of incoming signals in the ratio of 1:2 in a relay chain of any length, is shown in FIG. 2. The controlling relay 12, 13, 14, 15 is actuated twice as often as the controlled relay 16, 17, 18, 19 and four times as often as the controlled relay 20, 21, 22, 23. This is done as follows: the half-wave voltage $P_1$ charges the capacitor 26 via the resistance 24, the rectifier 25, and the closed contact 14 of the controlling relay 12, 13, 14, 15. Capacitors 27—29 cannot be charged, because they are short-circuited through the closed contacts 18 and 22 as well as through the rectifiers 30—33. This situation obtains until a control signal, such as actuation of the key 34, 35, closes contacts 34. As a result the half-wave voltage $P_2$ energizes winding 12 of the control relay 12, 13, 14, 15, thus breaking contact 14 and making contact 15. The energy stored in capacitor 26 energizes coil 17 of the controlled relay 16, 17, 18, 19. This effects the opening of contact 18 and the closing of contact 19. After the control has been transmitted, corresponding to the return of key 34, 35 to its rest position 35, the voltage half-wave $P_2$ returns the controlling relay 12, 13, 14, 15 to the switching position shown in FIG. 2.

Because the contacts 18 and 23 are now open, the half-wave voltage $P_1$ charges the condenser 27 over the rectifier 37, and the condenser 28 over the rectifier 38. The condenser 26 cannot be charged, since it is short-circuited over the contact 18, 19 in switch position 19. The same holds true for the condenser 29, which is also short-circuited over the contact 22, 23 in position 22. When the key of switch 34, 35 is pressed again, the winding 12 of the controlling relay 12, 13, 14, 15 is excited by the half-wave $P_2$, and its contact 15 is closed, so that the condenser 27 is discharged over the winding 16 of the controlling relay 16, 17, 18, 19 and its contact 18 closes again. The condenser 28 is discharged over the winding 21 of the controlling relay 20, 21, 22, 23 and its contact 23 closes. When the switch 34, 35 returns to its original position, the winding 13 of the controlling relay 12, 13, 14, 15 is excited again and the contact 14, 15 returns to its original position 14. The half-wave voltage $P_1$, which arrives now, charges the condenser 26 over the rectifier 25, the condenser 27 is short-circuited over the contact 18, the condenser 28 by the same contact over the recifier 32 and the condenser 29 likewise by this contact 18 over the rectifiers 31, 33. If the switch 34, 35 is now actuated again in the direction of position 34, the contact 15 is closed again by the excitation of its relay 12, 13, 14, 15 over its winding 12, so that the condenser 26 is discharged over the winding 17 of the controlled relay 16, 17, 18, 19, effecting a reversal of its contact into the position 19. When returning switch 34, 35 into its starting position with contacts 35 closed, the controlling relay 12, 13, 14, 15 shifts again into the switch position 14 by excitation by means of the half-way voltage $P_2$. With the contacts 18 and 22 now open, the half-wave voltage $P_1$ can charge the condenser 27 over the rectifier 37 and the condenser 29 over the rectifier 39. The condenser 26 is short-circuited over the contact 19 and the condenser 28 over the contact 23. A further actuation of switch 34, 35 in position 34 effects an excitation of the winding 12 of the controlling relay 12, 13, 14, 15 by the half-wave voltage $P_2$, and thus a reversal of its contact in switch position 15, so that the condenser 27 is discharged over the winding 16 of the controlled relay 16, 17, 18, 19 and can thus effect a reversal of its contact into the switch position 18. Likewise, the condenser 29 is discharged over the winding 20 of the controlled relay 20, 21, 22, 23 and closes its contact 22.

If switch 34, 35 is now brought again into its starting position, the winding 13 of the controlling relay 12, 13, 14, 15 is excited by the half-wave voltage $P_2$, so that its contact 14 closes again, reaching its starting position as shown in FIG. 3.

Relays such as 6—7, 12—13, 16—17 and 20—21 having two stable positions are well known and generally are polarized relays. Although for the sake of clarity the relays have been shown in a simplified form, it should be noted that polarized relays are generally used and preferred.

The reduction ratio of switching frequency of successive controlled relays can be increased indefinitely, in accordance with a geometrical progression, by connecting as many controlled relays as desired to the common line 36, inserting rectifiers in series like rectifiers 31 and 32.

The rectifiers 25 and 37—39 prevent undesired false discharges of capacitors 26—29 through the relay coils 16, 17, and 20, 21 which are not directly connected in parallel, while the resistance 24 and 40—42 serve to prevent direct short circuits of the half-wave voltage $P_1$ with respect to the common terminal N.

Circuits for reducing the number of signals in accordance with the invention can be used for numerical representation of actual as well as nominal values in follow-up controls, automatic tracking, and digital controls, especially for flows, channels, and electrical measurements, whenever the number of signals entering the circuit of the invention is a measure of the instantaneous actual or nominal value. Continuous comparison of the number of signals proportional to the actual value, corresponding to the instantaneous state of the reduction-ratio circuit for signal number, with a manually preselectable circuit state or with the state of another reduction-ratio circuit for signal number, corresponding to the signal number proportional to the theoretical value, is employed here to influence the switching unit employed for control or regulation.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed is:

A relay circuit for use as a counting device, comprising first and second terminals adapted to be energized by $P_1$ and $P_2$ pulse trains, respectively, said pulse trains being one hundred-eighty degrees apart in phase, a ground terminal, a bistable control relay connected to said second terminal and said ground terminal, a switch for enabling said control relay to assume its respective states in response to said $P_2$ pulses, and an additional relay circuit for indicating the number of times said switch is operated, said additional circuit comprising a plurality of bistable controlled relays, each of said controlled relays including a first coil and a first capacitance, and a second coil and a second capacitance, said capacitances being coupled between said first terminal and a contact of said control relay, whereby at least one capacitance is coupled to said $P_1$ pulses to be charged thereby when said control relay is in one state, and whereby each of said capacitances is connected across its associated coil when said control relay is in its other state, the contacts of said controlled relays being connected in branches across said capacitances to selectively short circuit predetermined capacitances, depending upon the number of times said switch is operated, when said control relay is in said one state, and unilateral conducting means for preventing said capacitances from discharging through any coil other than its associated coil.

References Cited in the file of this patent

UNITED STATES PATENTS

| 2,635,197 | Routledge | Apr. 14, 1953 |
| 2,801,372 | Renick | July 30, 1957 |
| 2,954,512 | Hardison | Sept. 27, 1960 |

FOREIGN PATENTS

| 719,744 | Germany | Apr. 16, 1942 |